United States Patent
Yang et al.

(10) Patent No.: US 8,154,153 B2
(45) Date of Patent: Apr. 10, 2012

(54) METHOD AND APPARATUS FOR PROVIDING A COMMUNICATION CHANNEL THROUGH AN OUTPUT CABLE OF A POWER SUPPLY

(75) Inventors: Ta-yung Yang, Milpitas, CA (US); Jenn-Yu G. Lin, Taipei (TW)

(73) Assignee: Systems General Corp., New Taipei (TW)

( * ) Notice: Subject to any disclaimer, the term of this patent is extended or adjusted under 35 U.S.C. 154(b) by 417 days.

(21) Appl. No.: 11/627,052

(22) Filed: Jan. 25, 2007

(65) Prior Publication Data
US 2008/0180262 A1 Jul. 31, 2008

(51) Int. Cl.
*H02J 7/00* (2006.01)
(52) U.S. Cl. ......... 307/66; 363/74; 363/21.02; 340/635; 340/636.1; 323/267; 323/283
(58) Field of Classification Search ............... 340/635, 340/636.1, 636.19, 538, 538.12, 538.16, 340/538.17, 310.11, 310.13, 310.17, 310.18; 307/23, 64, 66; 713/340; 324/522; 363/74, 363/21.02; 375/258; 323/283
See application file for complete search history.

(56) References Cited

U.S. PATENT DOCUMENTS

| | | | | |
|---|---|---|---|---|
| 4,459,582 A * | 7/1984 | Sheahan et al. | ......... | 340/539.16 |
| 4,481,642 A * | 11/1984 | Hanson | ......... | 375/223 |
| 4,538,136 A * | 8/1985 | Drabing | ......... | 375/306 |
| 5,859,584 A | 1/1999 | Counsell et al. | ......... | 340/538 |
| 6,233,343 B1 * | 5/2001 | Muranami et al. | ......... | 381/96 |
| 6,842,108 B2 * | 1/2005 | Akiyama et al. | ......... | 340/310.11 |
| 6,956,464 B2 * | 10/2005 | Wang et al. | ......... | 375/258 |
| 6,989,735 B2 * | 1/2006 | Fisher et al. | ......... | 375/258 |
| 7,046,124 B2 * | 5/2006 | Cope et al. | ......... | 375/258 |
| 7,057,907 B2 * | 6/2006 | Oh | ......... | 363/21.05 |
| 7,183,900 B2 * | 2/2007 | Sullivan | ......... | 370/488 |
| 7,245,515 B2 * | 7/2007 | Chiang | ......... | 363/146 |
| 7,274,175 B2 * | 9/2007 | Manolescu | ......... | 323/267 |
| 7,286,044 B2 * | 10/2007 | Yanagida et al. | ......... | 340/310.11 |
| 7,339,458 B2 * | 3/2008 | Cern | ......... | 340/310.16 |
| 7,355,362 B2 * | 4/2008 | Pai et al. | ......... | 318/432 |
| 2003/0025594 A1* | 2/2003 | Akiyama et al. | ......... | 340/310.01 |
| 2005/0169056 A1* | 8/2005 | Berkman et al. | ......... | 365/185.22 |
| 2006/0192434 A1* | 8/2006 | Vrla et al. | ......... | 307/64 |
| 2007/0030716 A1* | 2/2007 | Manolescu | ......... | 363/84 |
| 2008/0122642 A1* | 5/2008 | Radtke et al. | ......... | 340/660 |

FOREIGN PATENT DOCUMENTS

CN 1833360 9/2006

* cited by examiner

*Primary Examiner* — George Bugg
*Assistant Examiner* — Anne Lai
(74) *Attorney, Agent, or Firm* — J.C. Patents

(57) ABSTRACT

A power supply system is introduced herein. The power supply system includes a power converter to supply a power source to an electronic circuit through an output cable of the power supply. A communication unit is coupled to the output cable of the power supply to develop a communication channel between the power converter and the electronic circuit in order to report the status of the power converter to the electronic circuit.

4 Claims, 7 Drawing Sheets

METHOD AND APPARATUS FOR PROVIDING A COMMUNICATION CHANNEL THROUGH AN OUTPUT CABLE OF A POWER SUPPLY

BACKGROUND OF THE INVENTION

1. Field of the Invention

The present invention relates to a power supply, and more particularly to a communication circuit of a power supply.

2. Description of the Related Art

Power supplies are used to provide a regulated power source to the electronic circuit such as computers, home appliances, etc. The power supply is also used for protecting the user from electric shock. The power supply thus becomes a significant unit that needs to be certified by safety requirements. Beside, the power supply will produce heat during the power conversion. Therefore, many products are developed to use an external power supply or a power adaptor to simplify the product design, such as notebook computers and a mobile phone charger, etc. However, the drawback of using the external power supply is lacking information of the power supply, such as the output voltage, output current and the operating temperature, etc., which causes the difficult for the power management and protections.

SUMMARY OF THE INVENTION

The present invention provides a power supply system, in which a status of a power converter can be to report to an external electronic circuit for power management and protections.

A power supply system of the present invention includes a power converter to supply a power source to an electronic circuit through an output cable. A communication unit is coupled to the output cable to develop a communication channel between the power converter and the electronic circuit. An inductive device is further coupled to the output cable to provide impedance in between the power converter and the communication unit. The communication unit transmits the communication data over the output cable in order to report the status of the power converter to the electronic circuit. The communication data is modulated to a frequency-shift-key (FSK) signal for the transmission.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1 schematically shows a computer talks to a power supply through the output cable of the power supply.

DESCRIPTION OF THE PREFERRED EMBODIMENTS

Figure 1:
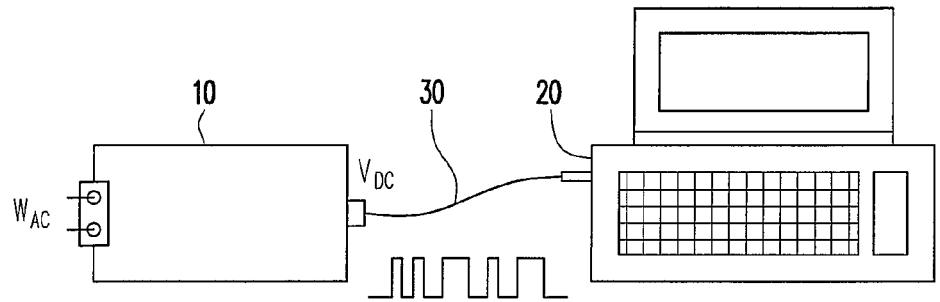
Figure 2:
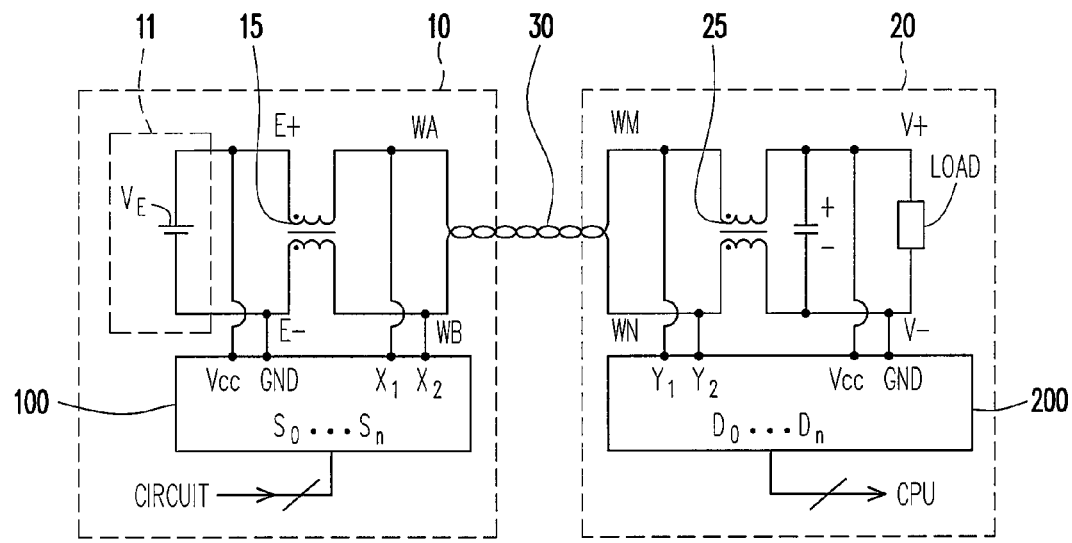
FIG. 2 is a preferred embodiment of a circuit schematic having a communication channel across an output cable of the power supply according to the present invention.

The present invention seeks to provide a communication channel in between a power supply and an electronic circuit through an output cable of the power supply. There is thus provided in accordance with a preferred embodiment of the present invention as shown in FIG. 1 and FIG. 2. A power supply 10 includes a power converter 11 for supplying a power source $V_E$ to an electronic circuit 20 through an output cable 30. The power source $V_E$ includes two terminals E+ and E−. A communication unit 100 is coupled to the output cable 30 to develop a communication channel between the power converter 11 and the electronic circuit 20. The output cable 30 has four terminals. WA, WB, WM and WN. The terminals WA and WB are connected to the power supply 10. Terminals WM and WN are connected to the electronic circuit 20. The power source $V_E$ has low output impedance. An inductive device 15, which is coupled to the terminals E+ and E− of the power source. $V_E$ and the terminals. WA and WB of the output cable 30 provides impedance to the power converter 11 and the communication unit 100. The impedance built by the inductive device 15 forms a communication path over the output cable 30 for the data transmission.

The communication unit 100 is used to transmit communication data over the output cable 30 in order to report the status of the power converter 11 to the electronic circuit 20. The communication unit 100 and the inductive device 15 are located in the power supply 10. The communication unit 100 acquires the status data $S_N \ldots S_0$ from the power converter 11. The status data $S_N \ldots S_0$ include the data of the power converter 11 such as the input voltage, the output voltage and the temperature.

Another communication unit 200 and another inductive device 25 are equipped in the electronic circuit 20. The inductive device 25 is connected to terminals WM and WN of the output cable 30 and two terminals V+ and V− of the load of the electronic circuit 20. The input data $D_N \ldots D_0$ received by the communication unit 200 will be passed to the control unit (CPU for example) of the electronic circuit 20 for the power management and protections. Communication units 100 and 200 achieve the communication in between the power supply 10 and the electronic circuit 20.

The inductive devices 15 and 25 are common mode chokes that provide low impedance path for the power source $V_E$ to deliver power to the electronic circuit 20. However, common mode choke offers high impedance for common mode signal, which isolated the communication signal of communication units 100 and 200 from the power source $V_E$.

Figure 3:
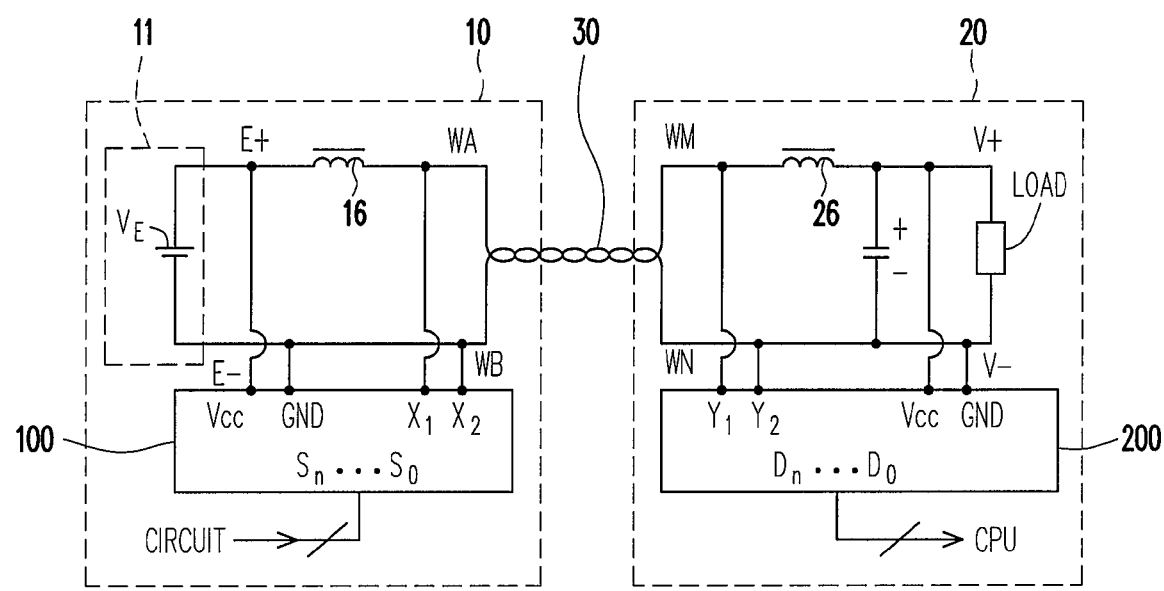
FIG. 3 is another preferred embodiment of a circuit schematic having a communication channel across an output cable of the power supply according to the present invention.

Another preferred embodiment of the present invention is shown in FIG. 3, in which a single-end inductor 16 is utilized to provide high impedance in between communication units 100 and the power source $V_E$. Furthermore, a single-end inductor 26 is used to provide high impedance in between communication units 200 and the load of the electronic circuit 20. Although inductors 16 and 26 cannot present low impedance path for the power source $V_E$ to the electronic circuit 20, the cost of inductors 16 and 26 are cheaper than inductive devices 15 and 25 shown in FIG. 2.

Figure 4A:
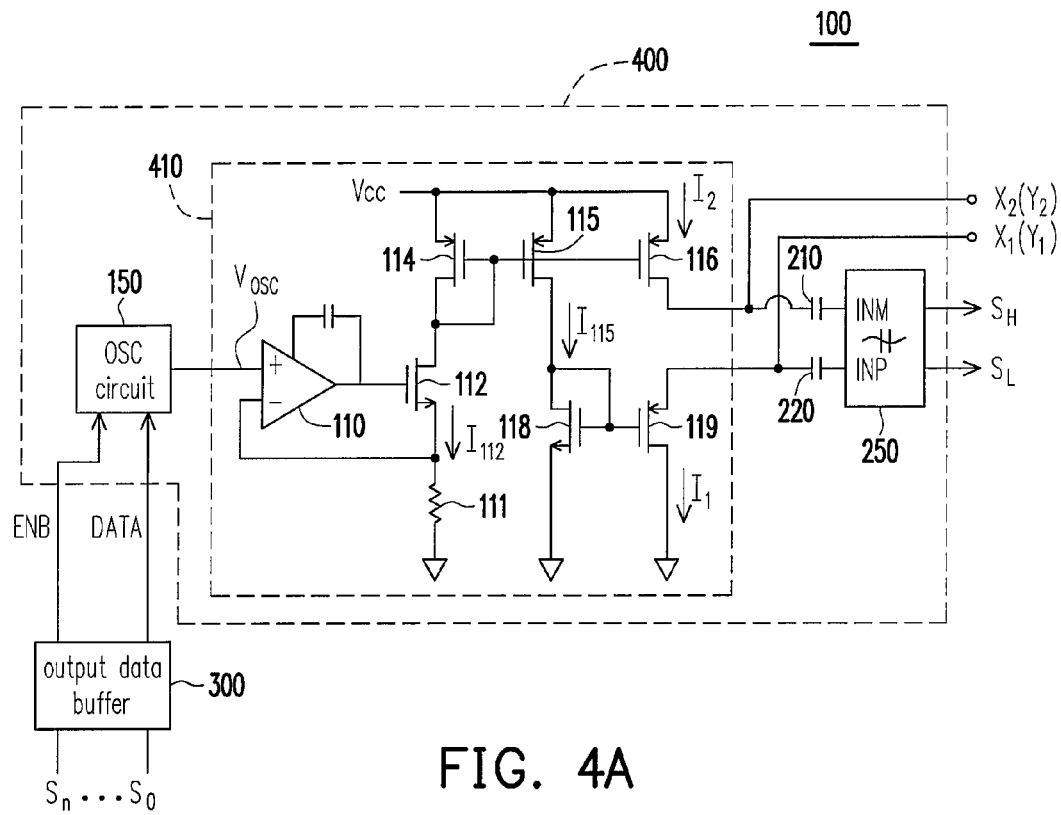
FIG. 4A shows a communication unit according to an embodiment of the present invention.

FIG. 4A shows the communication unit 100 according to an embodiment of the present invention. The communication unit 100 includes an output data buffer 300 and an interface circuit 400.

Figure 4B:
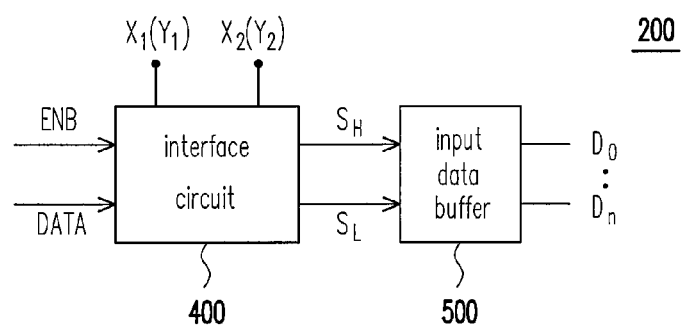
FIG. 4B shows another communication unit according to an embodiment of the present invention.

FIG. 4B shows an embodiment of another communication unit 200 according to an embodiment of the present invention. The communication unit 200 includes an input data buffer 500 and the interface circuit 400. The interface circuit 400 of the communication unit 200 is the same as the interface circuit of the communication unit 100. The communication data of communication unit 100 is modulated to a frequency-shift-key (FSK) signal coupled to the output cable 30 of the power supply 10. The communication unit 100 includes an oscillation circuit (OSC) 150 to generate the FSK signal in response to an output data (DATA) of the communication unit 100. Through terminals X1 and X2, an output circuit 410 is coupled to the output cable 30 of the power supply 10 to output the FSK signal.

An operational amplifier 110, a resistor 111 and transistors 112, 114, 115, 116, 118 and 119 develop the output circuit 410 of the interface circuit 400 of the communication unit 100. The output signal $V_{OSC}$ of the oscillation circuit 150 is the FSK signal generated in accordance with the output data (DATA) of the communication unit 100. The output signal $V_{OSC}$ is connected to the operational amplifier 110. The operational amplifier 110, resistor 111 and the transistor 112 form a voltage-to-current converter to generate a current signal $I_{112}$ at the transistor 112 in response to the output signal $V_{OSC}$ of the oscillation circuit 150. Transistors 114, 115 and 116 develop a current mirror to generate a current signal $I_{115}$ and a current signal I2 at the transistor 115 and 116 respectively. The current signal $I_{112}$ is connected to the transistor 114. Therefore, the current signal $I_{115}$ and the current signal I2 are generated in response to the current signal $I_{112}$. The current signal $I_{115}$ is coupled to transistor 118. Transistors 118 and 119 form another current mirror to generate a current signal $I_1$ at the transistor 119 in response to the current signal $I_{115}$. The FSK signal is formed in response to the current signal $I_1$ and $I_2$. The FSK signal coupled to the output cable 30 through terminals X1 and X2.

An input circuit shown in FIG. 4 is coupled to terminals WA and WB of the output cable 30 to receive the FSK signal. Capacitors 210, 220 form the input circuit. A filtering circuit 250 is coupled to the input circuit to generate data signals $S_H$ and $S_L$ in response to the FSK signal.

Figure 5:
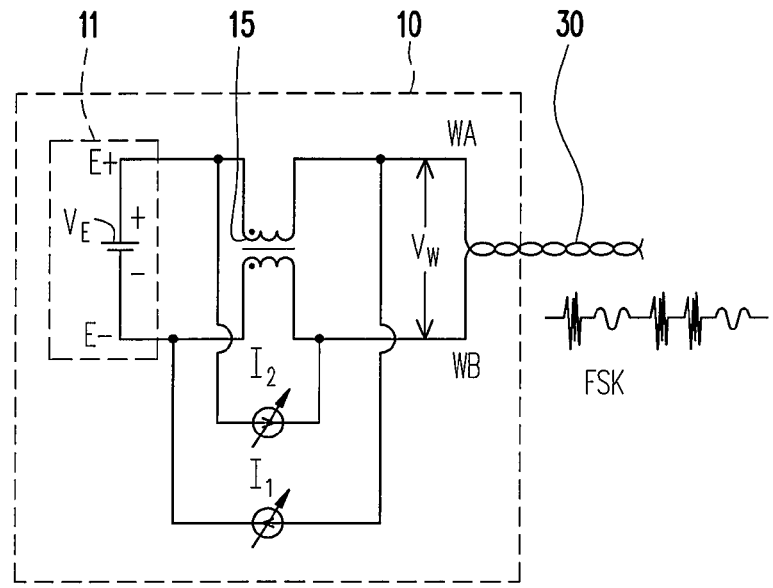
FIG. 5 shows an equivalent circuit of the communication channel according to an embodiment of the present invention.

FIG. 5 shows an equivalent circuit of the communication channel through the output cable 30. The current signals $I_1$ and $I_2$ associated with the inductive device 15 generate a signal $V_W$ across terminals WA and WB of the output cable 30.

$$Vw = 2\pi \times f \times L \times \Delta I \quad (1)$$

where f is the frequency of the FSK signal; L is the equivalent inductance of the inductive device; $\Delta I$ is the difference current of the current signal $I_1$ and $I_2$.

Figure 6:
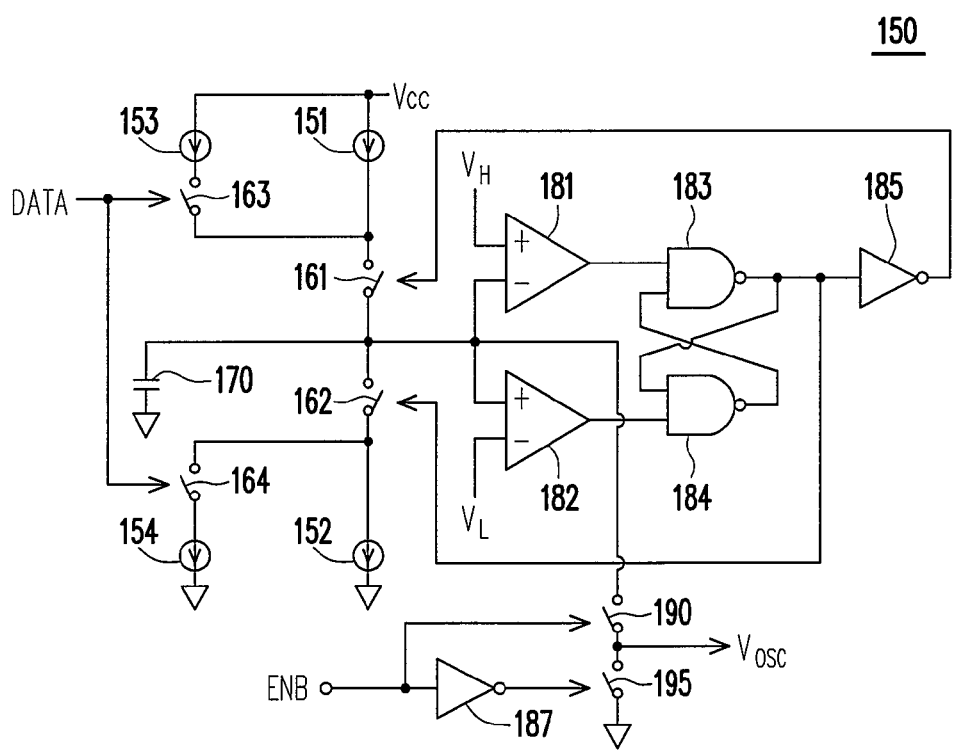
FIG. 6 is an oscillation circuit of the communication unit according to an embodiment of the present invention.

FIG. 6 shows an embodiment of the oscillation circuit 150. The output signal $V_{OSC}$ is a low frequency signal when the output data (DATA) is logic-low. The output signal $V_{OSC}$ is; a high frequency signal once the oscillation circuit 150 receives a logic-high output data (DATA). A current source 151 is provided to charge a capacitor 170 through a switch 161. A current source 12 is provided to discharge the capacitor 170 through a switch 162. A current source 153 is provided with a switch 163 in series. The current source 153 and the switch 163 are connected with the current source 151 in parallel. A current source 154 is connected with a switch 164 in series. The current source 154 and the switch 164 are connected with the current source 152 in parallel. Switches 163 and 164 are controlled by the output data (DATA). A comparator 181 having a trip-point voltage $V_H$ is connected to the capacitor 170. A comparator 182 having a trip-point voltage $V_L$ is connected to the capacitor 170. NAND gates 183 and 184 form a latch circuit. The NAND 183 is connected to the output of the comparator 181. The NAND gate 184 is connected to the output of the comparator 182. The output of the NAND gate 183 is connected to control the switch 162.

Through an inverter 185, the output of the NAND gate 183 controls turning on or turning off the switch 161. The oscillation signal is thus produced at the capacitor 170 for generating the output signal $V_{OSC}$. The output signal $V_{OSC}$ is connected to the capacitor 170 through a switch 190. The switch 190 is enabled or disabled by an enable signal ENB. Besides, a switch 195 connected to ground is utilized to disable the output signal $V_{OSC}$. The switch 195 is controlled by the enable signal ENB inverted by an inverter 187. The frequency shift of the output signal $V_{OSC}$ for the low frequency $F_{OSC\_L}$ and the high frequency $F_{OSC\_H}$ can be expressed as, $$F_{OSC\_L} = k \times \frac{I_{151}}{(V_H - V_L) \times C_{170}} \quad (2)$$

$$F_{OSC\_H} = k \times \frac{I_{151} + I_{153}}{(V_H - V_L) \times C_{170}} \quad (3)$$

where k is a constant determined by the ratio of the charge current and the discharge current; $I_{151}$ is the current of the current source 151; $I_{153}$ is the current of the current source 153; $C_{170}$ is the capacitance of the capacitor 170; $V_H$ is the voltage of the trip-point voltage $V_H$; $V_L$ is the voltage of the trip-point voltage $V_L$.

The output signal $V_{OSC}$ thus includes three states. The high frequency $F_{OSC\_H}$ represents logic-high. The low frequency $F_{OSC\_L}$ represents logic-low. The disable of the output signal $V_{OSC}$ stands for the space of the data, which is controlled by the enable signal ENB.

Figure 7:
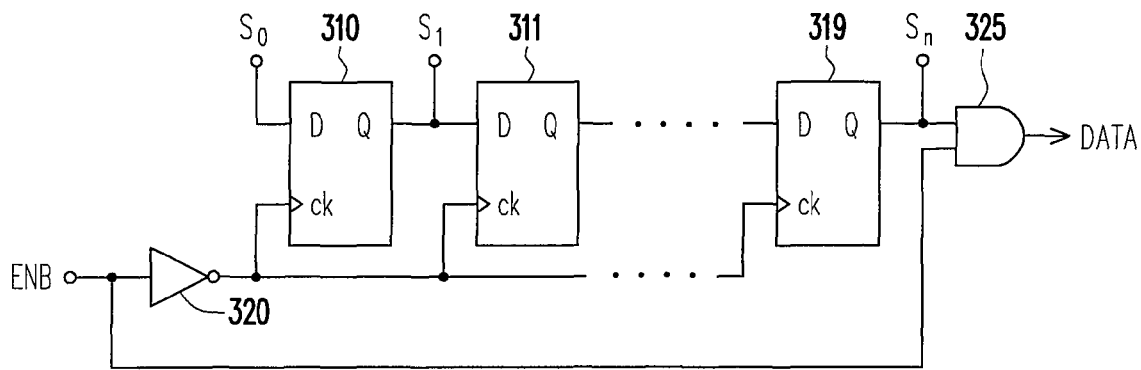
FIG. 7 shows an output data buffer of the communication unit according to an embodiment of the present invention.

FIG. 7 shows an embodiment of an output data buffer 300 of the communication unit 100. A plurality of flip-flops 319, . . . , 311 and 310 connect in series and store the status data $S_N$ . . . $S_0$ of the power converter 11. Furthermore, the flip-flops 319 . . . 310 are configured as a shift register for the data output. The output of the flip-flop 319 is connected to an AND gate 325. Another input of the AND gate 325 is connected to the enable signal ENB. The output of the AND gate 325 produces the output data (DATA). The clock input of the flip-flops 319, . . . , 311 and 310 are connected to the enable signal ENB through an inverter 320. Therefore, the output data (DATA) is serially outputted in accordance with the clocking rate of the enable signal ENB.

Figure 8:
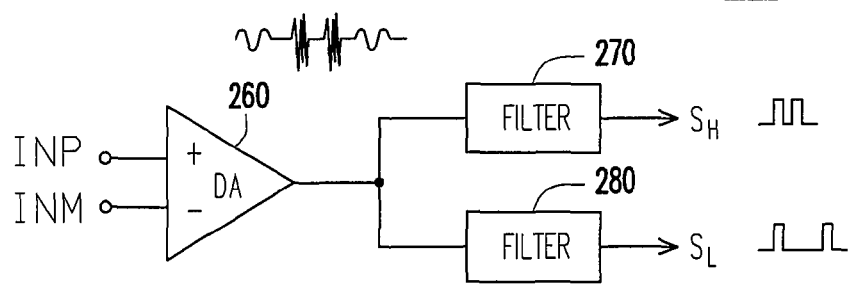
FIG. 8 is a filtering circuit of the communication unit according to an embodiment of the present invention.

FIG. 8 shows an embodiment of the filtering circuit 250 of the interface circuit 400 of the communication unit 100 shown in FIG. 4. A differential amplifier 260 has a negative input INM and a positive input INP connected to the capacitor 210 and 220 respectively. A filter 270 and a filter 280 are connected to the output of the differential amplifier 260. The filter 270 is developed to provide a band-pass frequency of $F_{OSC\_H}$ for generating a logic-high data signal $S_H$. The filter 280 is used for decoding a band-pass frequency of $F_{OSC\_L}$ in order to generate a logic-low data signal $S_L$.

Figure 9:
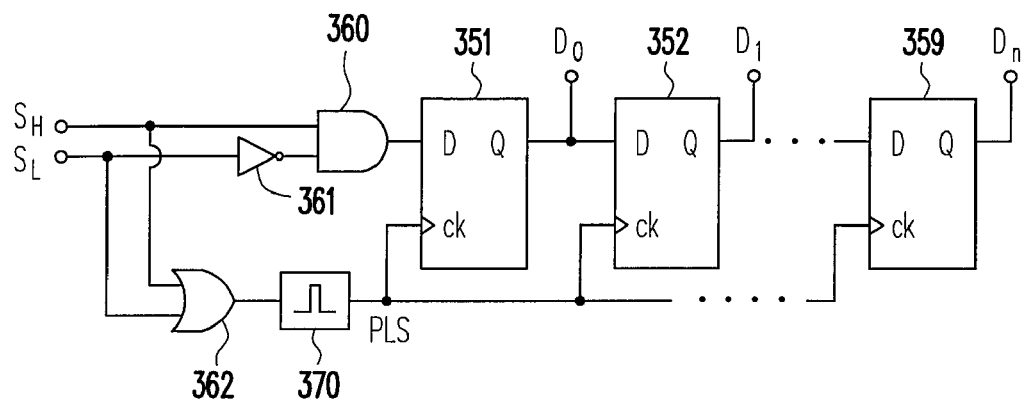
FIG. 9 shows an input data buffer of the communication unit according to an embodiment of the present invention.

The data signal $S_H$ and the data signal $S_L$ are further connected to the input data buffer 500 to produce the input data $D_N \ldots D_0$ as shown in FIG. 9. A plurality of flip-flops 351, 352, . . . and 359 are connected as a shift register for generating the data $D_N \ldots D_0$ in accordance with serial input data signals $S_H$ and $S_L$. The D-input of the flip-flop 351 is the input of the shift register. The data signal $S_H$ and $S_L$ are connected to an OR gate 362. The output of the OR gate 362 is connected to a one-shot circuit 370 to generate a pulse signal PLS. The pulse signal PLS is connected to clock inputs of the flip-flops 351, 352, . . . and 359. The data signal $S_H$ is further connected to an AND gate 360. The data signal $S_L$ is connected to another input of the AND gate 360 through an inverter 361. The output of the AND gate 360 is connected to the input of the shift register.

Figure 10:
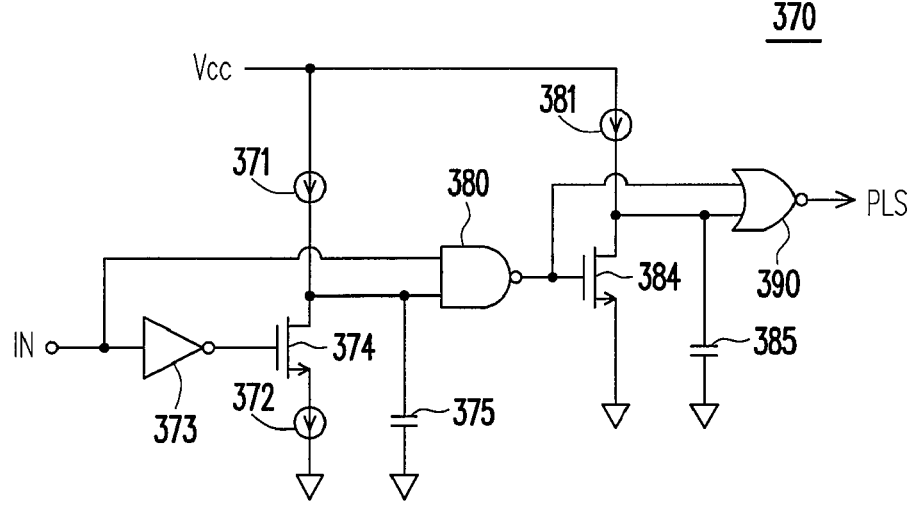
FIG. 10 shows a one-shot circuit for generating a pulse signal according to an embodiment of the present invention.
Figure 11:
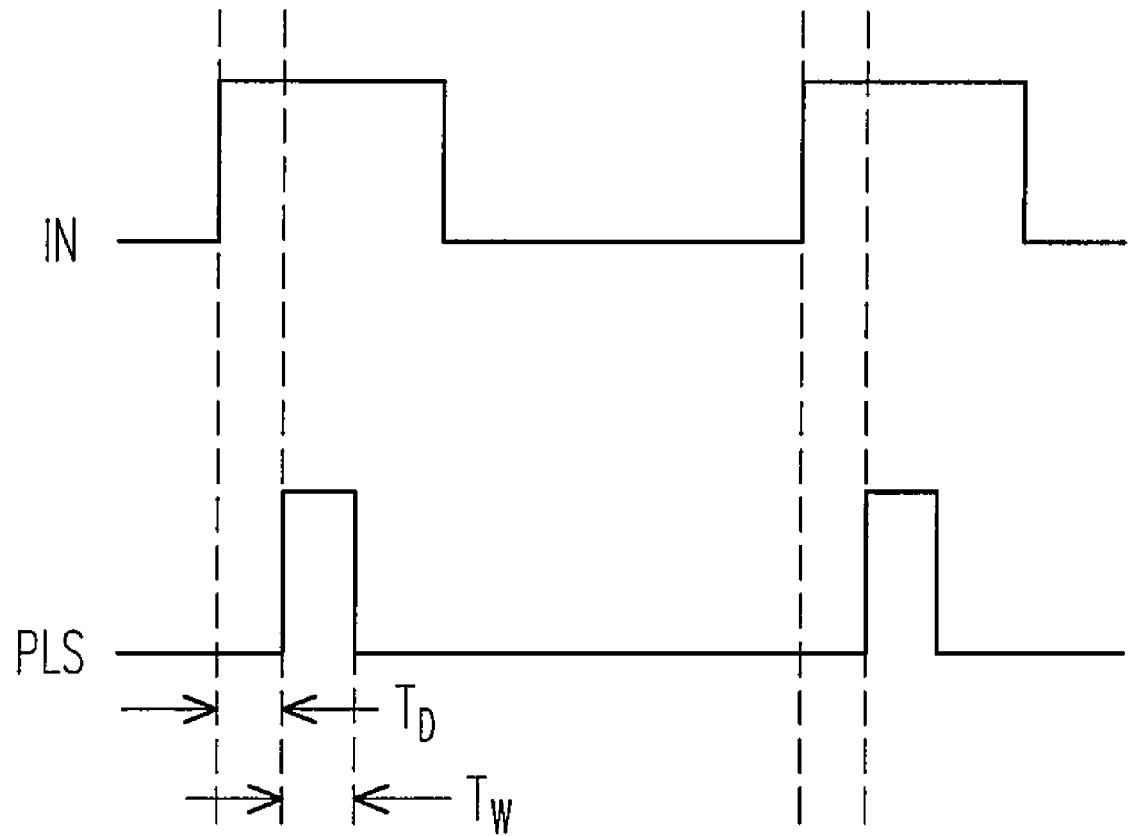
FIG. 11 shows waveforms of the input signal and the pulse signal according to an embodiment of the present invention.

FIG. 10 shows an embodiment of the one-shot circuit 370 as shown in FIG. 9. The input signal IN of the one-shot circuit 370 is connected to the input of an inverter 373 and the input of an NAND gate 380. The output of the inverter 373 controls a transistor 374. A current source 371 is connected to charge a capacitor 375. A current source 372 is used to discharge the capacitor 375 through the transistor 374. The capacitor 375 is further connected to another input of the NAND gate 380. The output of the NAND gate 380 is connected to the input of an NOR gate 390. The output of the NAND gate 380 is further used to control a transistor 384. A current source 381 is connected to charge a capacitor 385. The transistor 384 is used to discharge the capacitor 385. The capacitor 385 is connected to another input of the NOR gate 390 for generating the pulse signal PLS at the output of the NOR gate 390. FIG. 11 shows waveforms of the input signal IN of the one-shot circuit 370 and the pulse signal PLS, in which the current of the current source 371 and the capacitance of the capacitor 375 determine a delay time $T_D$. The current of the current source 381 and the capacitance of the capacitor 385 determine the pulse width $T_W$ of the pulse signal PLS.

It will be apparent to those skilled in the art that various: modifications and variations can be made to the structure of the present invention without departing from the scope or spirit of the invention. In view of the foregoing, it is intended that the present invention cover modifications and variations of this invention provided they fall within the scope of the following claims or their equivalents.

What is claimed is:

1. A power supply system, comprising:
   an output cable;
   a power converter, for supplying a power source to an electronic circuit through the output cable;
   a communication unit, directly connected to the output cable and directly connected to the power converter, for developing a communication channel between the power converter and the electronic circuit by sending modulated FSK status data signal of the power converter to the control unit of the electronic circuit; wherein the communication unit comprises:
   an output data buffer, for generating an output data in response to the status of the power converter;
   an oscillation circuit connected to the output data buffer and is used for generating the FSK signal in response to the output data from the output data buffer;
   an output circuit which comprises an operational amplifier and a plurality of current mirror transistors and is connected to the output cable of the power supply for generating FSK current signals in response to the output of the oscillation circuit and for outputting the FSK signal;
   an input circuit, connected to the output cable of the power supply, for receiving the FSK signal; and
   a filtering circuit which comprises a differential amplifier and two band pass filters for decoding a logic high and a logic low FSK signals and is connected to the input circuit and generates an input data for the input circuit; and
   an inductive device, connected between the output cable and the power converter, and directly connected to the communication unit, the inductive device is used for providing impedance in between the power converter and the communication unit.

2. The power supply system as claimed in claim 1, in which the inductive device is a common mode choke.

3. The power supply system as claimed in claim 1, in which the frequency-shift-key (FSK) signal is a current signal.

4. The power supply system as claimed in claim 1, in which the status of the power converter includes an input voltage, an output voltage and a temperature of the power converter.

* * * * *

UNITED STATES PATENT AND TRADEMARK OFFICE
CERTIFICATE OF CORRECTION

| | | |
|---|---|---|
| PATENT NO. | : 8,154,153 B2 | Page 1 of 1 |
| APPLICATION NO. | : 11/627052 | |
| DATED | : April 10, 2012 | |
| INVENTOR(S) | : Ta-yung Yang et al. | |

It is certified that error appears in the above-identified patent and that said Letters Patent is hereby corrected as shown below:

On the Title page of the patent grant, please replace item (73) Assignee's name from "Systems General Corp." to --SYSTEM GENERAL CORP.--

Signed and Sealed this
Fifth Day of November, 2013

Teresa Stanek Rea
*Deputy Director of the United States Patent and Trademark Office*